No. 870,432. PATENTED NOV. 5, 1907.
P. H. HIGLEY.
SEED PLANTER.
APPLICATION FILED JULY 7, 1906.

Witnesses
G. R. Thomas
J. B. MacNab

Inventor
P. H. Higley
By Chandler & Chandler
Attorneys

THE NORRIS PETERS CO., WASHINGTON, D. C.

UNITED STATES PATENT OFFICE.

PRATT H. HIGLEY, OF CHILLICOTHE, OHIO.

SEED-PLANTER.

No. 870,432.  Specification of Letters Patent.  Patented Nov. 5, 1907.

Application filed July 7, 1906. Serial No. 325,166.

*To all whom it may concern:*

Be it known that I, PRATT H. HIGLEY, a citizen of the United States, residing at Chillicothe, in the county of Ross, State of Ohio, have invented certain new and useful Improvements in Seed-Planters; and I do hereby declare the following to be a full, clear, and exact description of the invention, such as will enable others skilled in the art to which it appertains to make and use the same.

This invention has relation to seed planters, generally, and particularly to corn planters that embody runners in their construction or organization.

It is the object of the invention to provide an attachment to machines of the class mentioned, that is equipped with rotary disks arranged to run in advance of runner and form furrows on opposite sides of the seed-receiving furrow to be made by the runner, as and for a reason to be hereinafter explained.

The nature of the invention being thus indicated, I will proceed to describe the invention in detail, in view of the annexed drawings, forming a part of this specification, and then point out the part or improvement with distinctness and particularity in the subjoined claims.

Figure 1:
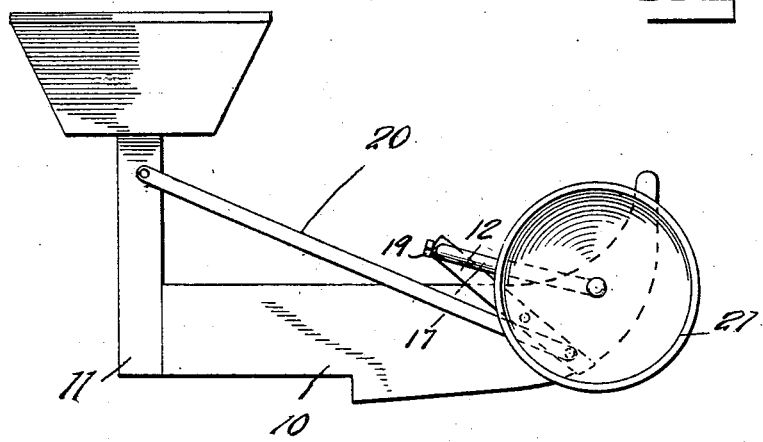
Figure 2:
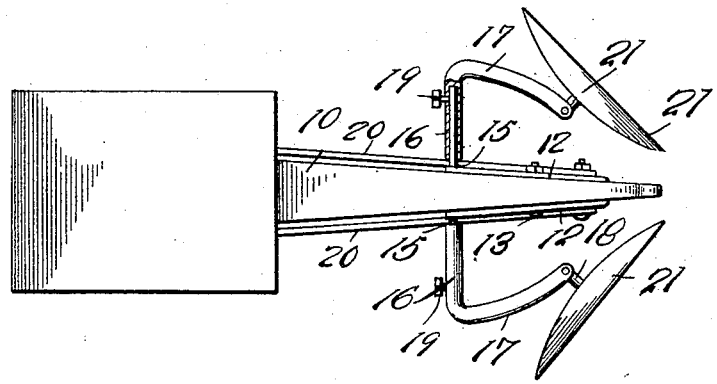
Figure 3:
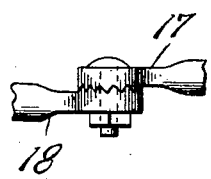

Of the said drawings:—Figure 1 is a side elevation of the runner of a corn planter equipped with my improvements. Fig. 2 is a plan view of the same. Fig. 3 is a detail view showing the manner of adjusting the spindles for the rotary disks on their supports.

Similar figures of reference designate similar parts or features, as the case may be, wherever they occur.

In the drawings, 10 designates the runner of a planter having a seed-dropping chute or stem 11 at its rear. These parts may be of usual or other satisfactory form and arrangement.

12 designates two bars connected at their lower forward ends and diverging from thence sufficiently to enable them to be arranged astride of the forward end of the runner and to be clamped thereon by bolts and nuts 13, as shown, or by other means suited to the purpose.

15 are lateral extensions of the bars 12 that project into the tubular parts 16 of the downwardly and forwardly extended disk supporting arms 17, provided on their free ends with the disk spindles 18 having an adjustable connection with the ends of the arms, so that the disks can be arranged to throw a wider or narrower furrow and to assist in adjusting them to leave a wider or narrower ridge between the disks for the seed furrow to be formed by the runner 10 that will follow them.

The arrangement of the horizontal parts 15 of the bars 12, with respect to the hollow parts 16 of the disk supporting arms, is such as to adjust the latter so as to "position" the disks exactly as wanted to meet circumstances, the thumb screws 19 tapped through the tubular part or bearing on the inner extensions being provided for that purpose, though it is apparent that other means may be provided for the same ends that will answer as well, and they may be used without affecting the general nature of the invention.

One or more braces 20 may be connected with the arms 12 near their nose and extend back to the chute to support the parts, but these will hardly be needed under ordinary circumstances.

In operation, the disks 21, 21 on the spindles 18 will be adjusted to form as deep and as wide a furrow as may be desired for the runner to make a seed-receiving furrow therebetween, and it being pre-supposed that the bars 12 and their adjuncts were suited to be secured to the runner of the machine and adjusted in the best manner thereon to effect the best result.

I have not undertaken to explain all of the ways in which my attachment may be applied to corn planters, since these machines, made by different manufacturers, differ sometimes in form, that a little mechanical skill may be required to fit the improved attachment on the runner, so that the best results may be derived therefrom.

It is designed to employ disks of common construction that are used in plows and harrows to form shallow furrows by throwing the ground engaged by them aside or turning it over. As has been indicated, the two disks on the spindles 18 will act upon the ground in opposite directions, throwing the earth away from the ridge left between them; and the runner following it will form the usual furrow for the dropping of the seed that will be covered by the coverer trailing after the runner.

Under this construction, in the first cultivation of the corn, any clods or lumps of earth that may be moved or thrown toward the rows will not be likely to fall on the tender stalks, as they would do if they were in a depression or furrow, but will tend to "hill up" along the ridge already initiated in exactly the way desired, and this is the chief end aimed at in my improvements, which, as before stated, may be varied mechanically so that different circumstances may be made to contribute to the accomplishment of the principal object of the invention.

What is claimed as the invention, is:—

An attachment for the runner of seed planters comprising two bars attached to the forward portions of the runners and inclined upwardly and rearwardly, their upper rearward ends extending above the runner and provided with lateral extensions, hollow angular disk-supporting arms into the upper portion of which the said extensions are projected and adjustable, the lower ends of the arms projecting forwardly toward the front end of the runner and provided on their free ends with spindles to support furrow-opener disks, the said spindles being adjustably connected with the disks.

In testimony whereof, I affix my signature, in presence of two witnesses.

PRATT H. HIGLEY.

Witnesses:
  ISAAC CLARK,
  E. B. MERRILL.